(12) United States Patent
Fert et al.

(10) Patent No.: US 11,401,836 B2
(45) Date of Patent: Aug. 2, 2022

(54) PORTION OF A FLUID DRAINAGE CONDUIT FOR A TURBOMACHINE

(71) Applicant: SAFRAN AIRCRAFT ENGINES, Paris (FR)

(72) Inventors: Jérémy Edmond Fert, Moissy-Cramayel (FR); Bellal Waissi, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/771,813

(22) PCT Filed: Dec. 12, 2018

(86) PCT No.: PCT/FR2018/053228
§ 371 (c)(1),
(2) Date: Jun. 11, 2020

(87) PCT Pub. No.: WO2019/115939
PCT Pub. Date: Jun. 20, 2019

(65) Prior Publication Data
US 2021/0172348 A1 Jun. 10, 2021

(30) Foreign Application Priority Data
Dec. 14, 2017 (FR) ...................... 1762108

(51) Int. Cl.
*F01D 25/32* (2006.01)
*F01M 11/04* (2006.01)
(52) U.S. Cl.
CPC ............. *F01D 25/32* (2013.01); *F01M 11/04* (2013.01); *F05D 2260/602* (2013.01)

(58) Field of Classification Search
CPC .... F02C 7/232; F01D 25/32; F05D 2260/602; F05D 2260/6022; B64C 1/1453; Y10S 220/06; Y10S 165/195
See application file for complete search history.

(56) References Cited

U.S. PATENT DOCUMENTS

| | | | | |
|---|---|---|---|---|
| 3,623,053 A | * | 11/1971 | Meyer | G01M 3/26 137/558 |
| 5,035,011 A | * | 7/1991 | Rozenblatt | B64D 11/02 4/316 |

(Continued)

OTHER PUBLICATIONS

International Search Report issued in International Application No. PCT/FR2018/053228 dated Mar. 26, 2019, with English translation (5 pages).

*Primary Examiner* — Stephanie Sebasco Cheng
(74) *Attorney, Agent, or Firm* — Bookoff McAndrews, PLLC

(57) ABSTRACT

Portion of a fluid drainage conduit for a turbomachine, comprising an upstream stretch, a downstream stretch fixed relative to the upstream stretch and a retention chamber onto which the upstream stretch opens. The retention chamber is capable of communicating with the downstream stretch through a first aperture and a second aperture. The drainage conduit portion comprises an obturator to obturate the second aperture. The first and second apertures are provided so that when the obturator obturates the second aperture, the retention chamber retains fluid by allowing a fluid overflow to flow from the upstream stretch to the downstream stretch through the first aperture, and when the obturator does not obturate the second aperture, the fluid can flow from the upstream stretch to the downstream stretch at least through the second aperture.

12 Claims, 4 Drawing Sheets

(56) References Cited

U.S. PATENT DOCUMENTS

| | | | |
|---|---|---|---|
| 5,285,636 A | 2/1994 | Mayo et al. | |
| 8,890,698 B2* | 11/2014 | Mougin | G08B 21/182 |
| | | | 340/618 |
| 10,487,780 B2* | 11/2019 | Swenson | F17C 9/00 |
| 2007/0205321 A1* | 9/2007 | Waide | B64D 35/04 |
| | | | 244/17.23 |
| 2013/0201023 A1* | 8/2013 | Mougin | G08B 21/182 |
| | | | 340/618 |
| 2021/0246834 A1* | 8/2021 | Lepretre | F16H 57/0435 |

* cited by examiner

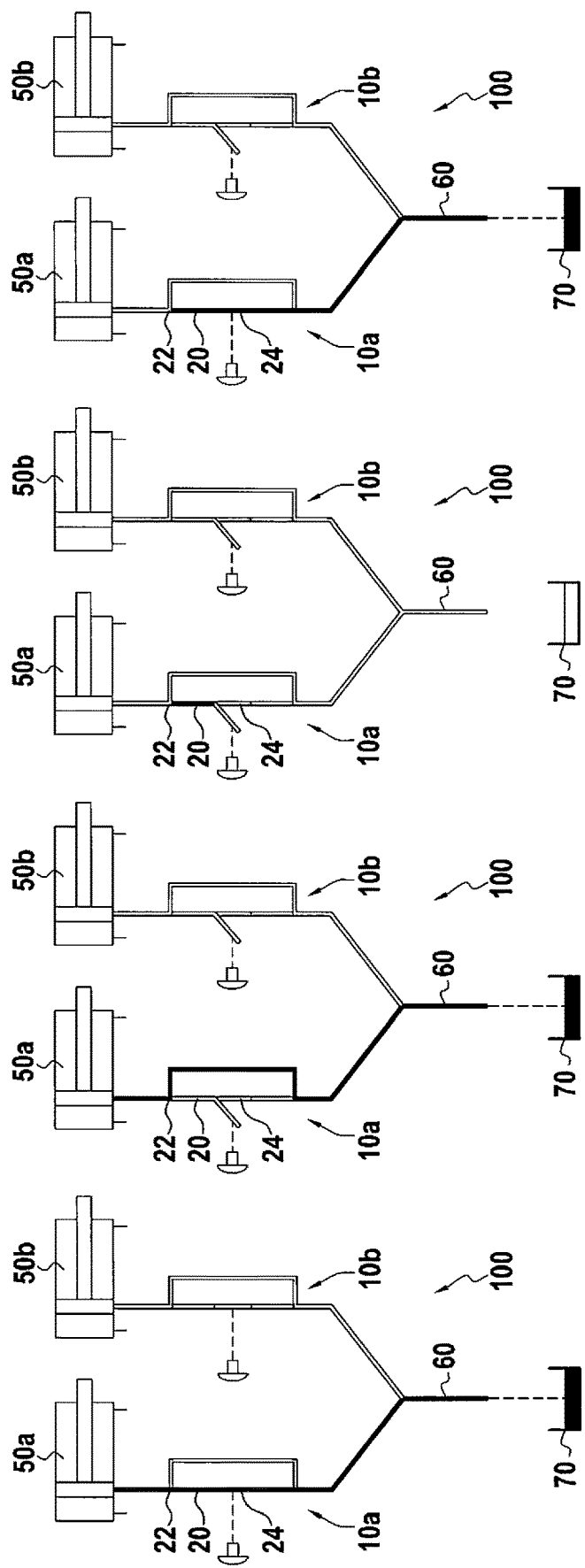

US 11,401,836 B2

PORTION OF A FLUID DRAINAGE CONDUIT FOR A TURBOMACHINE

CROSS-REFERENCE TO RELATED APPLICATIONS

This application is the U.S. national phase entry under 35 U.S.C. § 371 of International Application No. PCT/FR2018/053228, filed on Dec. 12, 2018, which claims priority to French Patent Application No. 1762108, filed on Dec. 14, 2017.

TECHNICAL FIELD

The present disclosure relates to the detection of leaks on an aircraft turbomachine, and more particularly a portion of a fluid drainage conduit for a turbomachine, a drainage assembly comprising such a conduit portion and a method for detecting a leak on a turbomachine provided with such a drainage assembly.

TECHNOLOGICAL BACKGROUND

Turbomachines, in particular those used on aircrafts, use fluids such as hydraulic fluid, fuel, oil or else water. Industrial and regulatory constraints make it necessary to manage the leaks related to these fluids, which leads manufacturers to provide drainage conduits to recover leaks at each component liable to leak. This recovery is associated with a maintenance requirement, in order to determine which components are leaking.

To this end, document U.S. Pat. No. 5,285,636 discloses a drainage box to which lead the drainage conduits of all the concerned components, each conduit leading to a separate chamber. The fluids are then stored in the drainage box and the filling level of the chambers allows determining the leak rate.

Nevertheless, such a system requires separate drainage conduits from each component to the drainage box. However, for reasons of weight and integration, it is preferable to group the drainage conduits into common drains. However, in these cases, it is currently difficult and time consuming to determine from which component the leak originates. Furthermore, such a drainage box is a complex and expensive equipment. There is therefore a need for a new type of drainage conduit portion.

GENERAL PRESENTATION

To this end, the present disclosure relates to a fluid drainage conduit portion for an aircraft turbomachine, comprising an upstream stretch, a downstream stretch fixed relative to the upstream stretch and a retention chamber onto which the upstream stretch opens, the retention chamber being capable of communicating with the downstream stretch through at least one first aperture and at least one second aperture, the drainage conduit portion further comprising an obturator configured to obturate the second aperture, the first and second apertures being provided so that when the obturator obturates the second aperture, the retention chamber is capable of retaining fluid by allowing a fluid overflow to flow from the upstream stretch to the downstream stretch through the first aperture, and when the obturator does not obturate the second aperture, the fluid can flow from the upstream stretch to the downstream stretch at least through the second aperture.

For simplicity, the term "conduit" will be used to designate either a drainage conduit or a drainage conduit portion, it being understood that a conduit portion forms a conduit and that a conduit can form a portion of a larger conduit.

It is understood that there may be one or more first apertures, and one or more second apertures. Unless otherwise specified, "a" or "the" first or second aperture means "at least one" or "the at least one" or else "each" first or second aperture. Conversely, the generic use of the plural may include the singular.

The terms "upstream" and "downstream" are understood in the normal flowing direction of fluid leaks through the drainage conduit. The upstream stretch is upstream of the retention chamber. Likewise, the downstream stretch is downstream of the retention chamber. The fluid thus flows from the upstream stretch to the downstream stretch via the retention chamber.

The first aperture is separate from the second aperture. The first aperture allows fluid communication between the retention chamber and the downstream stretch. The second aperture, except when obturated, allows fluid communication between the retention chamber and the downstream stretch. The second aperture may be provided so as to be arranged lower than the first aperture during operation of the turbomachine.

The obturator can be controlled, for example manually or electronically, to obturate or not the second aperture.

Thanks to the above features, the drainage conduit can retain part of the leaks in the retention chamber, in particular between the first aperture and the second aperture. During maintenance, by successively actuating the obturators connected to the various components, it is possible to easily and quickly determine which component is leaking, even if all the drainage conduits open onto common drainage conduits.

Furthermore, the recovery of leaks in the downstream stretch, whether the second aperture is obturated or not, allows a clean treatment of leaks in all cases. Thus, it is possible to reduce the fines imposed by airports in the event of fouling the runway.

In some embodiments, the obturator comprises a valve, a control member of which is accessible from outside the drainage conduit portion. Thus, the actuation of the obturator is easy for a mechanic.

In some embodiments, the second aperture is arranged so as to allow, when the obturator does not obturate it, communicating the retention chamber with the downstream stretch. For example, the second aperture can be arranged in a lower portion of the retention chamber to allow the evacuation by gravity of the retained liquid. It is understood that the drainage conduit is designed to be fixed to a turbomachine with a determined orientation, and that it is possible to position the second aperture taking account of this orientation.

More generally, in some embodiments, the first aperture is closer to the upstream stretch than the second aperture, and/or the second aperture is closer to the downstream stretch than the first aperture.

In its intended orientation, the drainage conduit portion can be designed to allow a gravitational flow of leaks from upstream to downstream. It is understood that all the fluid coming from the upstream stretch then flows by gravitational flow towards the retention chamber, the fluid being able to pass only through one of the first aperture and the second aperture to reach the downstream stretch. Thanks to the aforementioned feature, due to a gravitational flow from the upstream stretch towards the retention chamber, a natural accumulation can occur between the second obturated aperture and the first aperture. The first aperture is used as an overflow for the retention chamber to the downstream stretch, which prevents the accumulation of a potentially flammable fluid in the upstream stretch and improves safety. When the second aperture is no longer obturated, a gravitational flow of the content of the retention chamber occurs, via the second aperture, towards the downstream stretch.

In some embodiments, the drainage conduit comprises a first tubular wall forming the upstream stretch, a second tubular wall forming the downstream stretch, the first tubular wall and the second tubular wall being interlocked into one another.

"Forming" is understood as meaning that the first and second tubular walls form at least the upstream and downstream stretches, respectively. Indeed, as will be detailed later, the tubular walls also can form other portions, for example the retention chamber. Thanks to the fact that the first tubular wall and the second tubular wall are interlocked (fitted) into one another, the drainage conduit has a better compactness.

In some embodiments, the first tubular wall and the second tubular wall are interlocked into one another to form the retention chamber. Thus, the retention chamber can be formed between the first and second tubular walls, or else inside a single tubular wall, in the portion surrounded by the other tubular wall. For example, the retention chamber can be formed by the first tubular wall, in the extension of the upstream stretch, in a portion where the second tubular wall surrounds the first tubular wall.

In some embodiments, the first tubular wall and the second tubular wall are coaxial.

In some embodiments, the obturator is mounted in an orifice of the first wall and an orifice of the second wall, opposite one another. The orifice of the first wall and the orifice of the second wall face each other, which allows the obturator to be mounted through these walls. The orifice of the first or second wall can, depending on the case, be used as a second aperture for communication between the retention chamber and the downstream stretch. In these embodiments, the installation of the obturator is facilitated.

In some embodiments, the obturator is mounted removable. This allows it to be removed, for example to clean it, repair it or replace it, or clean the rest of the drainage conduit.

The present disclosure also relates to a drainage assembly comprising at least two drainage conduit portions as previously described, the respective downstream stretches of which directly or indirectly open onto a common drainage conduit. For example, the respective downstream stretches can open onto drainage conduits which join into a common drainage conduit. The common drainage conduit can be intended to open onto a recovery area, whose content can be observed. It is therefore understood that the retention chambers are arranged upstream of the common drainage conduit(s). Indeed, provision can be made of several common drainage conduits successively grouped, deploying in a tree structure. As previously explained, the above-mentioned drainage conduit portions allow effectively diagnosing a leak despite the presence of a common drainage conduit, while the common drainage conduit brings advantages in terms of weight, integration and simplicity of the drainage system.

The present disclosure also relates to a turbomachine, in particular an aircraft turbomachine, comprising a drainage conduit or a drainage assembly as previously described.

The present disclosure also relates to a method for detecting a leak on a turbomachine comprising a drainage assembly as previously described, comprising the following steps for at least one portion of the portions of the drainage conduit:

obturating the respective second apertures, if necessary by actuating the corresponding obturators;

after a predetermined duration, successively actuating at least one portion of the respective obturators of the drainage conduit portions so that the obturators do not obturate the second corresponding apertures.

"Respective" and "corresponding" refer to portions of the same drainage conduit.

It is understood that, in order to apply this method, only a portion of the drainage conduits of the drainage assembly can be considered, in particular if the failure of some components was previously ruled out.

By obturating all the respective second apertures of the considered conduit portions, some of the retention chambers can be filled in the event of a leak of the component to which they are connected by the upstream stretch. Successively actuating the respective obturators of the drainage conduit portions, implicitly in the direction of opening the corresponding second aperture since the second aperture was previously obturated, allows the flowing of fluid from the corresponding retention chamber towards the downstream stretch then the common drainage conduit. Thus, by observing the correspondence between the actuation of an obturator and the flowing of fluid leaving the common drain, it is possible to easily and quickly determine which component is leaking.

In the obturation step, it is not necessary to actuate the obturators which already obturate the second corresponding aperture.

Moreover, it is possible to stop the actuation step as soon as one has found which component is leaking, without actuating the obturators of the remaining components.

BRIEF DESCRIPTION OF THE DRAWINGS

The invention and its advantages will be better understood upon reading the detailed description which follows, of embodiments given by way of non-limiting examples. This description refers to the appended drawings, in which:

FIGS. 6A, 6B, 6C, 6D schematically show a drainage assembly and the steps of a leak detection method according to one embodiment.

DETAILED DESCRIPTION OF EMBODIMENTS

Figure 1:
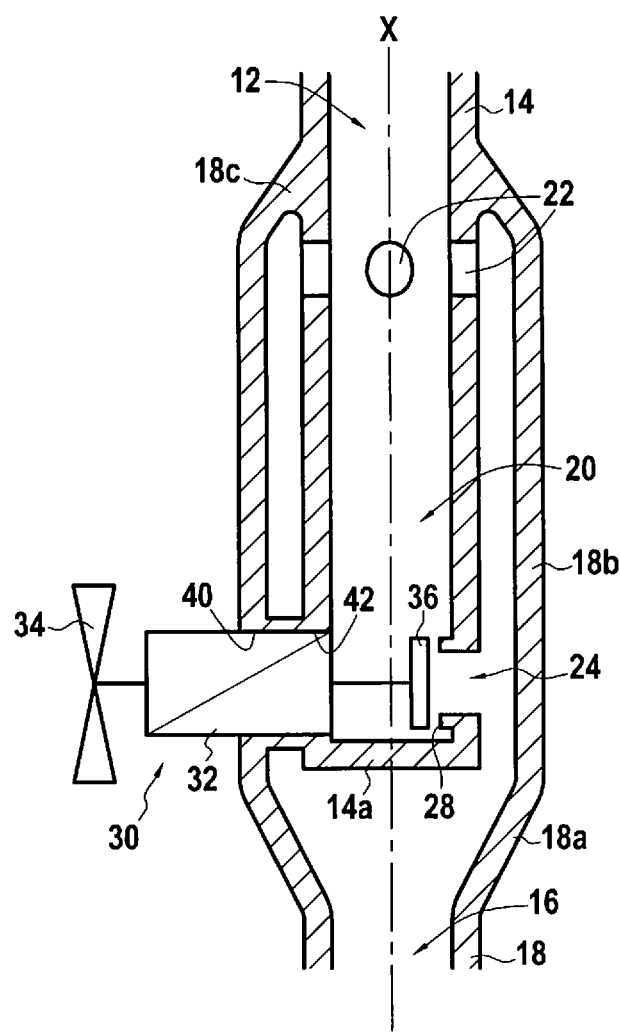
FIG. 1 shows, in longitudinal cross-section, a drainage conduit according to a first embodiment.

A portion of the drainage conduit, or a drainage conduit, according to a first embodiment is shown with reference to FIG. 1, which illustrates a longitudinal cross-section thereof. Such a drainage conduit is capable of being mounted on an aircraft turbomachine in order to collect any fluid leaks emanating from a component.

The drainage conduit 10 comprises an upstream stretch 12 and a downstream stretch 16. In this case, the upstream stretch 12 is formed by a first tubular wall 14, while the downstream stretch 16 is formed by a second tubular wall 18. The tubular walls 14, 18 are here of circular cross-section but could have other cross-section shapes and/or cross-sections different from each other. In this case, the tubular walls 14, 18 are coaxial around a longitudinal axis X, which is here straight but can be curved or broken-lined, for example if the drainage conduit forms an elbow.

The downstream stretch 16 is fixed relative to the upstream stretch 12, here thanks to the fact that these stretches 12, 16 are fixedly assembled to each other, without the possibility of moving. More specifically, the tubular walls 14, 18 are here formed in one-piece, which can be manufactured by additive manufacturing.

As shown in FIG. 1, the tubular walls 14, 18 are interlocked into one another. Indeed, the tubular walls 14, 18 overlap in a radial direction (perpendicular to the longitudinal axis X and passing through this axis). Here, the first tubular wall 14 is substantially cylindrical, that is to say of substantially constant cross section transversely to the longitudinal axis X. The second tubular wall 18 has, as it approaches the first tubular wall 14, a flaring 18a, of increasing cross-section, resulting in an enlarged cross-section 18b of the second wall 18. The first tubular wall 14 is surrounded by the enlarged cross-section 18b. The enlarged cross-section 18b is extended, opposite the flaring 18a, by a tapered portion 18c, of decreasing cross-section, allowing the junction between the first tubular wall 14 and the second tubular wall 18.

As illustrated in FIG. 1, in this embodiment, the first tubular wall 14, upstream of the junction with the second tubular wall 18, is in the extension of the second tubular wall 18 downstream of the flaring 18a, which provides a good compactness to the drainage conduit 10.

The drainage conduit 10 also comprises a retention chamber 20. The upstream stretch 12 opens onto the retention chamber 20, here thanks to the fact that the retention chamber 20 is formed inside the first tubular wall 14, for example in the extension of the upstream stretch 12. A fortiori, the retention chamber 20 is inside the second tubular wall 18. The first tubular wall 14 ends, in the downstream direction, by a transverse bottom wall 14a. More generally, as can be seen in FIG. 1, all the fluid flowing in the upstream stretch 12 is directed by gravitational flow towards the retention chamber 20.

As indicated above, the drainage conduit 10 has at least one first aperture 22 and at least one second aperture 24 for fluid communication between the retention chamber 20 and the downstream stretch 16. In the present case, the drainage conduit has a plurality of first apertures 22, three of which are shown in the view of FIG. 1, regularly distributed circumferentially, and a single second aperture 24. For the sake of brevity, however, reference will be made to a first aperture 22 and a second aperture 24, without loss of generality. Furthermore, the number and arrangement of the first and second apertures may vary.

The first aperture 22 is here arranged further upstream than the second aperture 24. In other words, the first aperture 22 is closer to the upstream stretch 12 than the second aperture 24. Moreover, the second aperture 24 is closer to the downstream stretch 16 than the first aperture 22.

In this example, the first aperture 22 and the second aperture 24 are formed in the first tubular wall 14, more specifically in the portion of the first tubular wall 14 separating the retention chamber 20 from the downstream stretch 16. The first and second apertures 22, 24 are here of circular cross-section and oriented radially, but other cross-sections or orientations are possible. Thus, as illustrated, the fluid coming from the upstream stretch 12 is forced to pass either through the first aperture 22, or through the second aperture 24 to reach the downstream stretch 16.

In addition, the drainage conduit 10 comprises an obturator 30. The obturator 30 is configured to obturate the second aperture 24. In the case of several second apertures 24, an obturator allowing to obturate them all or a plurality of obturators can be provided, said plurality being configured to obturate all the second apertures 24.

In this example, the obturator 30 is in the form of a tap and comprises a body 32 as well as a control member 34. The control member 34 is accessible from outside the drainage conduit 10, so that an operator can handle it. The control member 34 controls, via a mechanism provided in the body and known per se, the movement of a valve 36, here so as to bring the valve 36 closer to or further away from the second aperture 24. The periphery of the second aperture 24 forms a seat 28 capable of cooperating with the valve 36 for obturating the second aperture 24. The valve 36 is here movable inside the retention chamber 20.

The obturator 30 is mounted in an orifice 42 of the first tubular wall 14 and an orifice 40 of the second tubular wall 18. The orifices 40, 42 are opposite one another in order to facilitate the mounting of the obturator 30, or even its removal when the obturator 30 is mounted removable. Here, the orifices 40, 42 are provided diametrically opposite the second aperture 24. More generally, the obturator 30 is here mounted facing the second aperture 24.

The obturator 30 can be mounted in the orifices 40, 42 by screwing. In the present case, given the configuration of the obturator 30, an angular positioning indexing is not necessary, however it could be provided.

The drainage conduit 10 may be intended to be installed on an aircraft turbomachine substantially in the orientation illustrated in FIG. 1. In this orientation, as seen in FIG. 1, the second aperture 24 is arranged so as to allow, when the obturator 30 does not obturate it, emptying the retention chamber 20. The orientation of the drainage conduit 10 can be provided to facilitate the flowing of the fluid from the upstream stretch 12 towards the downstream stretch 16, via the retention chamber 20, taking into account the fact that the flowing is essentially driven by gravity.

More generally, when the obturator 30 obturates the second aperture 24, the retention chamber 20 communicates with the downstream stretch 16 only through the first aperture 22. As a result, the retention chamber 20 is capable of retaining fluid, namely the leaks from the upstream stretch, in the space which extends between the first aperture 22 and the second aperture 24. The first and second apertures 22, 24 are therefore spaced from each other in the direction of gravity. Furthermore, the fluid can flow from the upstream stretch 12 to the downstream stretch 16 through the first aperture 22, which is used as an overflow for the retention chamber 20. As illustrated in FIG. 1, the overflow channel connecting the first aperture 22 to the downstream stretch 16 bypassing the second aperture 24, which allows the fluid overflow to flow when the retention chamber 20 is filled, is devoid of obturation or fluid retention element. In other words, the overflow channel is unable to retain fluid. The function of overflow evacuation towards the downstream stretch 16 can therefore be ensured by said channel with reliability and with minimum bulk due to the absence of fluid retention volume in this channel. As can also be seen in FIG. 1, the overflow channel has a common wall with the retention chamber 20, in this case the first tubular wall 14. This arrangement improves the relative compactness of the drainage conduit portion 10 which includes the retention chamber 20.

When the obturator 30 does not obturate the second aperture 24, which corresponds to the configuration illustrated in FIG. 1, the fluid can flow from the upstream stretch 12 to the downstream stretch 16 at least through the second aperture 24. In this case, if the second aperture 24 is undersized relative to the leak rate coming from the upstream stretch 12, the fluid can flow towards the downstream stretch 14 also through the first aperture 22.

The use of this operation in the context of a leak detection method will be detailed below.

FIGS. 2 to 5B show a drainage conduit according to variants or other embodiments. In these figures, the elements corresponding or identical to those of the first embodiment will receive the same reference character and will not be described again.

Figure 2:
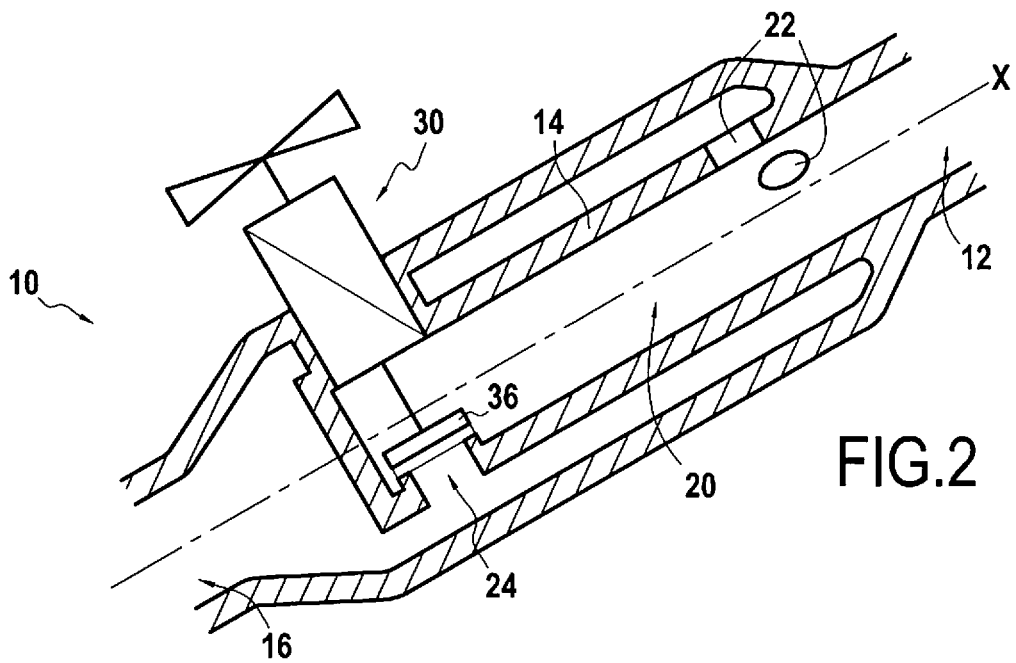
FIG. 2 illustrates, in longitudinal cross-section, a first variant of the drainage conduit according to the first embodiment.

FIG. 2 illustrates, in longitudinal cross-section, a drainage conduit 10 according to a first variant, similar to that of FIG. 1 but configured to be mounted in another orientation. Instead of being substantially vertical, the longitudinal axis X forms an angle of about 45° with the vertical direction. In order to maximize the volume of fluid that can be retained in the retention chamber 20, the first apertures 22 are not regularly distributed on the periphery of the first wall 14, but provided in the highest portion, in the vertical direction (direction of gravity), of an upstream segment of the retention chamber 20. According to the same principle, the second aperture 24 can independently be provided in a lowest portion, in the vertical direction, of a downstream segment of the retention chamber 20.

Figure 3:
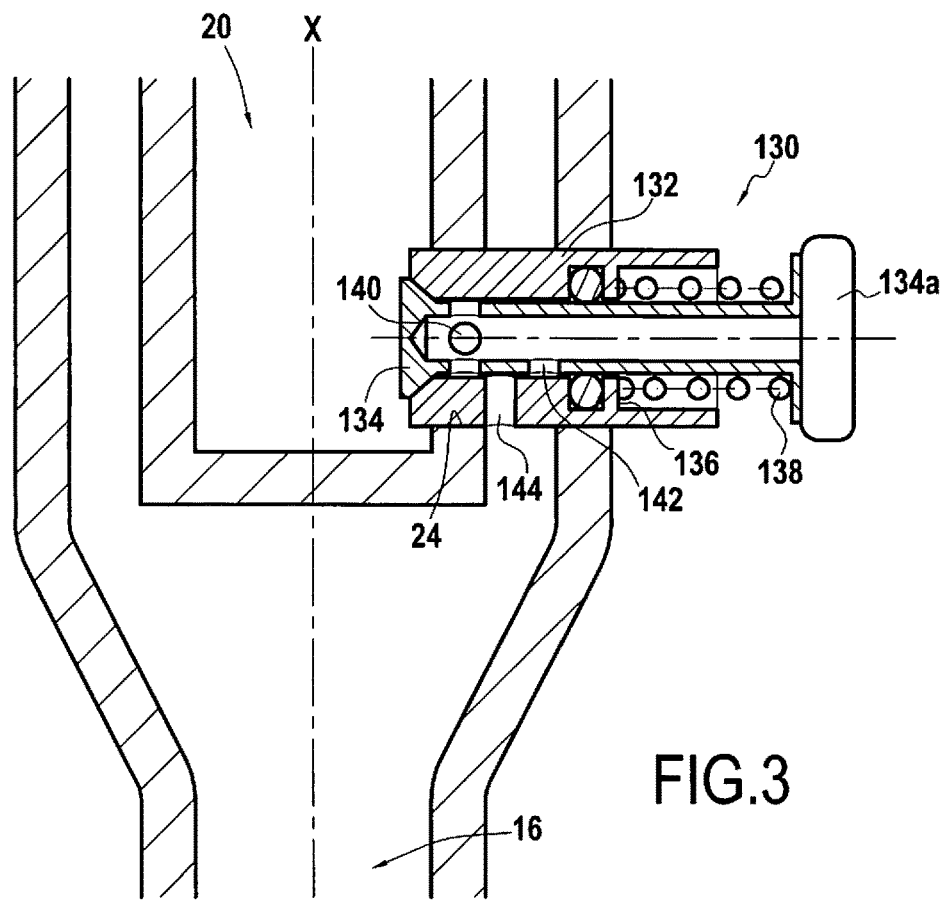
FIG. 3 illustrates, in longitudinal cross-section, a second variant of the drainage conduit according to the first embodiment.

FIG. 3 illustrates, in longitudinal cross-section, a drainage conduit 10 according to a second variant, similar to the embodiment of FIG. 1 but having a different obturator 130.

The obturator 130 according to this variant comprises a body 132 and a valve 134 sliding relative to the body. The valve 134 is integral with a push button 134a, forming a control member, for moving it. Maintaining the valve 134 in the obturated position of the second aperture 24 is ensured by return means, here a spring 138 mounted in compression between a shoulder 136 of the body 132 and the push button 134a. The valve 134 is in the form of a hollow rod having one or more first openings 140, at its end opposite to the push button 134a, and one or more second openings 142, between the first openings 140 and the push button 134a. In the position of the valve 134 illustrated in FIG. 3, the obturator 30 obturates the second aperture 24. By pressing the push button 134a, the valve 134 slides so that the first openings 140 are in fluid communication with the retention chamber 20, and that the second opening 142 is in fluid communication with the downstream stretch 16, for example by matching the second opening 142 with an orifice 144 of the body 132 opening onto the downstream stretch 16.

Compared to the obturator 30 previously described, the obturator 130 according to this second variant has the advantage that the seat of the valve 134 is integrated into the body 132. Thus, when the obturator 130 is removable, it is possible to check its operation and its sealing, or even to clean it, independently of the drainage conduit 10.

Furthermore, this avoids providing the orifices 40, 42 of the first embodiment, since one orifice in the second wall facing the second aperture 24 is sufficient. This variant illustrates the fact that the obturator 130 is mounted in an orifice of the first wall 14 and an orifice of the second wall 18, opposite one another, but in this variant, unlike the previous embodiments, the orifice of the first wall 14 is used as a second aperture 24.

Figure 4:
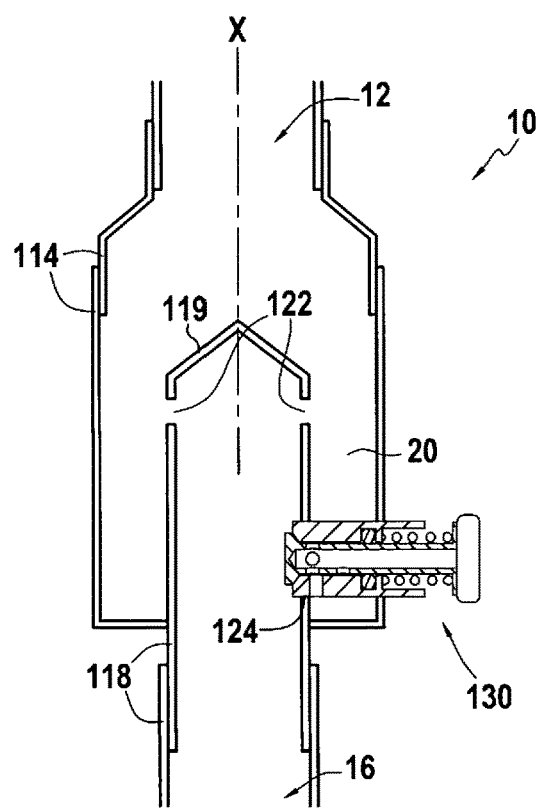
FIG. 4 schematically shows a drainage conduit according to a second embodiment.

A drainage conduit according to a second embodiment is schematically shown, in longitudinal cross-section, in FIG. 4.

In this embodiment, the drainage conduit 10 comprises a first tubular wall 114 forming the upstream stretch 12, a second tubular wall 118 forming the downstream stretch 16, the first tubular wall 114 and the second tubular wall 118 being interlocked into one another. However, in contrast to the first embodiment, it is the second tubular wall 118 which is interlocked into the first tubular wall 114. Thus, the first tubular wall 114 has a flaring and an enlarged cross-section, so as to surround the second tubular wall 118. The second tubular wall 118, in turn, has a substantially constant cross-section along the longitudinal axis X.

The retention chamber 20 is formed inside the first tubular wall 114, more specifically between the first and second tubular walls 114, 118. As a result, unlike the first embodiment, the retention chamber 20 is formed outside the second tubular wall 118. Here, the retention chamber 20 is annular around the axis X, but other shapes could be considered. In any event, the first tubular wall 114 and the second tubular wall 118 are coaxial in this example as well.

The second tubular wall 118 may have an end section 119 of conical type or equivalent to facilitate the flowing of the fluid on the sides of the downstream stretch 16, in the retention chamber 20.

As shown in FIG. 4, each tubular wall may comprise several segments, in particular several tubular segments assembled to each other, for example welded. This allows implementing conventional manufacturing techniques, without necessarily resorting to additive manufacturing.

The first apertures 122 and the second aperture 124 are here also provided to communicate the retention chamber 20 and the downstream stretch 16. In this embodiment, this implies that the first apertures 122 and the second aperture 124 are formed in the second tubular wall 118. Furthermore, despite the inversion of the first and second tubular walls 114, 118 compared to the first embodiment, this second embodiment remains such that a first aperture 122 is closer to the upstream stretch 12 than the second aperture 124, and the second aperture 124 is closer to the downstream stretch 16 than a first aperture 122.

FIG. 4 shows an obturator 130 identical to that of FIG. 3, however other types of obturators could be used, if necessary by providing the necessary orifices in the first and second tubular walls 114, 118.

Figure 5A:
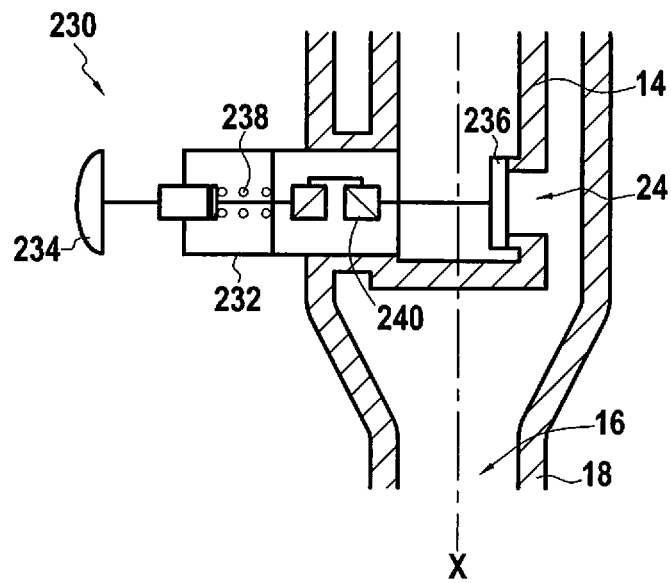
FIGS. 5A and 5B illustrate, in longitudinal cross-section, a variant of an obturator, here with reference to the first embodiment.
Figure 5B:
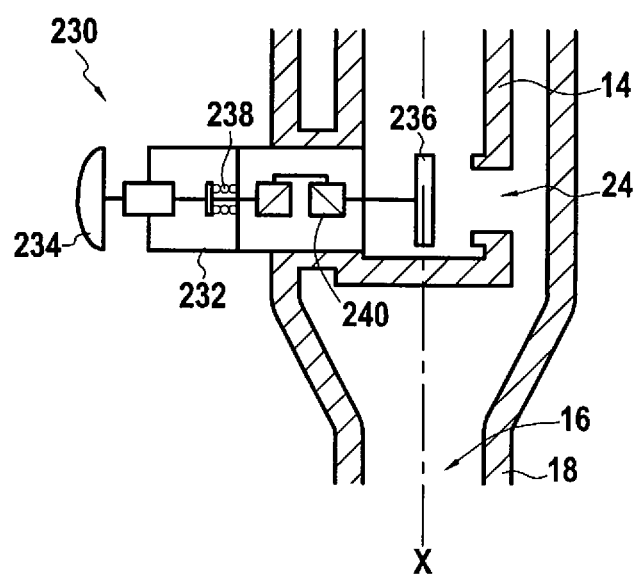

For example, FIGS. 5A and 5B illustrate, in longitudinal cross-section, a variant of obturator, here with reference to the first embodiment.

The obturator 230 according to this variant comprises a body 232 as well as a control member 234, in this case a push button. The control member 234 is accessible from outside the drainage conduit 10. The control member 234 controls, via a mechanism 240 provided in the body 232, the movement of a valve 236, here so as to bring the valve 236 closer or further away from the second aperture 24. The mechanism 240 is configured to transmit, in the opposite direction, the movement of the control member 234 to the valve 236. To this end, the mechanism 240 may comprise a doublet of reverse-threaded helical connections. Thus, the obturator 230 is normally in the position illustrated in FIG. 5A and when the control member 234 is pushed, the valve 236 is retracted (see FIG. 5B).

Moreover, maintaining the valve 234 in the obturated position of the second aperture 24 is ensured by return means, here a spring 238 mounted in compression between a shoulder of the body 132 and the control member 234.

The configuration of the first and second tubular walls 14, 18 is similar to that of the first embodiment.

Other variants of obturator are still possible, for example an obturator using a magnet and spring system to keep the valve in an opening or obturating position of the second aperture.

A leak detection method according to one embodiment will now be described with reference to FIGS. 6A to 6D, which schematically illustrate the steps thereof.

These figures show a drainage assembly 100 comprising at least two drainage conduits 10a, 10b, for example according to one of the embodiments previously described, and whose respective downstream stretches open onto a common drain 60. On the drainage conduit 10a, the locations of the first and second apertures 22, 24 as well as of the retention chamber 20, schematised here, have been identified.

The drainage conduits 10a, 10b are configured to recover leaks emanating from components of a turbomachine, here shown respectively as hydraulic cylinders 50a, 50b. The respective obturators of the drainage conduits 10a, 10b are shown with the schematic convention of electrical switches.

In FIG. 6A, the turbomachine is assumed to be in operation and it can be seen that the cylinder 50a is leaking (blackened conduit in FIG. 6A). The leak is recovered by the drainage conduit 10a, which directs it to the common drain 60 then to a recovery area 70 whose content can be observed. An operator observes a leak through the common drain 60 but cannot determine, at this stage, from which component the leak comes.

Noting a leak, the respective second apertures of the drainage conduits 10a, 10b are obturated, if necessary by actuating the obturators to this end. The situation obtained is illustrated in FIG. 6B. As can be seen in this figure, the retention chamber 20 is then capable of retaining fluid between the first aperture 22 and the second aperture 24 and the fluid can flow from the upstream stretch to the downstream stretch through the first aperture 22, which is used as an overflow to bypass the second aperture 24 obturated by the obturator.

Then the turbomachine is stopped, as a result of which the leak at the cylinder 50a stops. A predetermined period of time is required for the fluid to flow through the drainage conduits 10a, 10b and to the recovery area 70, with the exception of the fluid potentially contained in the respective retention chambers 20. This state is shown in FIG. 6C. Furthermore, at this step, as illustrated, it is possible to purge the recovery area 70 to facilitate the detection which will follow.

As illustrated in FIG. 6D, the respective obturators of the drainage conduits 10a, 10b are then actuated successively so that the obturators do not obturate the corresponding second apertures. In FIG. 6D, the obturator of the drainage conduit 10a has been actuated, which induces the flowing of the fluid from the corresponding retention chamber to the recovery area 70. The obturator of the drainage conduit 10b always obturating the second corresponding aperture, the operator can conclude that the fluid leak comes from the component connected to the drainage conduit 10a, that is to say in this case from the cylinder 50a.

Thus, a leak can be quickly and simply detected.

After detecting a leak from the cylinder 50a, it is possible to stop the detection operations, the defective component having been identified. Alternatively, the detection can be continued by successively actuating other obturators, with the purpose of allowing flow from other retention chambers and potentially detecting other defective components.

The step shown in FIG. 6A is not necessary if the obturators are already in the position of FIG. 6B, that is to say obturating the second corresponding apertures.

Moreover, the control member of an obturator configured to obturate the second aperture, such as the obturators 30, 130, and 230 described in the above, can be coupled to an actuator controlled remotely. For example, the actuator can be an offset electrical control actuator, by being connected to a computer of the turbomachine for example by a wired connection or by radio waves. Thus, in a drainage assembly 100 comprising at least two portions of the drainage conduit in accordance with the present disclosure, assuming that the control members of all the obturators are each coupled to an actuator, the leak detection such as for example carried out according to the method described with reference to FIGS. 6A to 6D can be carried out without the need to open covers which delimit a compartment in which the drainage assembly 100 is arranged. The process of selective obturation of the obturators followed by an opening after a predetermined duration can thus be automatically controlled by a computer of the turbomachine, for example upon the order of the operator responsible for observing a leak through the common drain 60.

Although the present description refers to specific embodiments, modifications can be made to these examples without departing from the general scope of the invention as defined by the claims. Particularly, individual features of the different illustrated/mentioned embodiments can be combined in additional embodiments. Consequently, the description and the drawings should be considered in an illustrative rather than restrictive sense.

The invention claimed is:

1. A portion of a fluid drainage conduit configured to be installed on an aircraft turbomachine, the portion of the fluid drainage conduit comprising:
    a first tubular wall forming an upstream stretch,
    a second tubular wall forming a downstream stretch fixed relative to the upstream stretch
    wherein
        (i) the first tubular wall is partially nested within a lumen formed by the second tubular wall, or
        (ii) the second tubular wall is partially nested within a lumen formed by the first tubular wall, and
    a retention chamber, formed i) by the first tubular wall, or formed ii) between the first tubular wall and the second tubular wall, onto which the upstream stretch opens,
    the retention chamber being capable of communicating with the downstream stretch through at least one first aperture and at least one second aperture provided so as to be arranged lower than the first aperture during operation of the turbomachine,
    both the at least one first aperture and the at least one second aperture being formed in one of the first tubular wall or the second tubular wall,
    the retention chamber being arranged so that the fluid coming from the upstream stretch flows by gravitational flow towards the retention chamber,
    the drainage conduit portion further comprising an obturator configured to obturate one of the at least one second aperture,
    the at least one first aperture and the at least one second apertures being provided so that when the obturator obturates the one of the at least one second aperture, the retention chamber is capable of retaining fluid while allowing a fluid overflow to flow from the upstream stretch to the downstream stretch through the at least one first aperture, and when the obturator does not obturate the one of the at least one second aperture, the fluid can flow from the upstream stretch to the downstream stretch at least through the one of the at least one second aperture.

2. The drainage conduit portion according to claim 1, wherein the obturator comprises a valve and a control member, wherein the control member is accessible from outside the drainage conduit portion.

3. The drainage conduit portion according to claim 1, the one of the at least one second aperture being arranged so as to allow, when the obturator does not obturate the one of the at least one second aperture, communicating the retention chamber with the downstream stretch.

4. The drainage conduit portion according to claim 1, wherein a distance between one of the at least one first aperture and the upstream stretch is less than a distance between the one of the at least one second aperture and the upstream stretch.

5. The drainage conduit portion according to claim 1, wherein the first tubular wall and the second tubular wall are coaxial.

6. The drainage conduit portion according to claim 1, wherein the obturator is mounted in an orifice of the first wall and an orifice of the second wall, opposite one another.

7. The drainage conduit portion according to claim 1, wherein the obturator is mounted removable.

8. A drainage assembly comprising at least two drainage conduit portions, each according to claim 1, the respective downstream stretches of which open onto respective drainage conduits which join into a common drainage conduit intended to open onto a recovery area whose content can be observed.

9. A method for detecting a leak on the aircraft turbomachine provided with the drainage assembly according to claim 8, comprising the following steps for at least part of the drainage conduit portions: —obturating the respective one of the at least one second apertures, if necessary by actuating the corresponding obturators; —after a predetermined duration, successively actuating the respective obturators of the drainage conduit portions so that the obturators do not obturate the one of the at least one second corresponding apertures.

10. The drainage conduit portion according to claim 1, wherein a distance between the one of the at least one second aperture and the downstream stretch is less than a distance between one of the at least one first aperture and the downstream stretch.

11. A portion of a fluid drainage conduit configured to be installed on an aircraft turbomachine, the portion of the fluid drainage conduit comprising a first tubular wall forming an upstream stretch,
a second tubular wall forming a downstream stretch fixed relative to the upstream stretch
wherein
(i) the first tubular wall is partially embedded within a lumen formed by the second tubular wall, or
(ii) the second tubular wall is partially embedded within a lumen formed by the first tubular wall, and
a retention chamber, formed i) by the first tubular wall, or formed between the first tubular wall and the second tubular wall, onto which the upstream stretch opens, the retention chamber being capable of communicating with the downstream stretch through at least one first aperture and at least one second aperture provided so as to be arranged lower than the first aperture during operation of the turbomachine, both the at least one first aperture and the at least one second aperture being formed in one of the first tubular wall or the second tubular wall, the retention chamber being arranged so that the fluid coming from the upstream stretch flows by gravitational flow towards the retention chamber, the drainage conduit portion further comprising an obturator configured to obturate one of the at least one second aperture, the at least one first aperture and the at least one second apertures being provided so that when the obturator obturates the one of the at least one second aperture, the retention chamber is capable of retaining fluid while allowing a fluid overflow to flow from the upstream stretch to the downstream stretch through the at least one first aperture, and when the obturator does not obturate the one of the at least one second aperture, the fluid can flow from the upstream stretch to the downstream stretch at least through the one of the at least one second aperture.

12. A portion of a fluid drainage conduit configured to be installed on an aircraft turbomachine, the portion of the fluid drainage conduit comprising a first tubular wall forming an upstream stretch,
a second tubular wall forming a downstream stretch fixed relative to the upstream stretch
wherein
(i) the first tubular wall is partially built into a lumen formed by the second tubular wall, or
(ii) the second tubular wall is partially built into a lumen formed by the first tubular wall, and
a retention chamber, formed i) by the first tubular wall, or formed between the first tubular wall and the second tubular wall, onto which the upstream stretch opens, the retention chamber being capable of communicating with the downstream stretch through at least one first aperture and at least one second aperture provided so as to be arranged lower than the first aperture during operation of the turbomachine, both the at least one first aperture and the at least one second aperture being formed in one of the first tubular wall or the second tubular wall, the retention chamber being arranged so that the fluid corning from the upstream stretch flows by gravitational flow towards the retention chamber, the drainage conduit portion further comprising an obturator configured to obturate one of the at least one second aperture, the at least one first aperture and the at least one second apertures being provided so that when the obturator obturates the one of the at least one second aperture, the retention chamber is capable of retaining fluid while allowing a fluid overflow to flow from the upstream stretch to the downstream stretch through the at least one first aperture, and when the obturator does not obturate the one of the at least one second aperture, the fluid can flow from the upstream stretch to the downstream stretch at least through the one of the at least one second aperture.

* * * * *